United States Patent [19]
Mitzenmacher et al.

[11] Patent Number: 5,953,503
[45] Date of Patent: Sep. 14, 1999

[54] COMPRESSION PROTOCOL WITH MULTIPLE PRESET DICTIONARIES

[75] Inventors: Michael David Mitzenmacher, Milpitas; Andrei Zary Broder; Jeffrey Clifford Mogul, both of Menlo Park, all of Calif.

[73] Assignee: Digital Equipment Corporation, Maynard, Mass.

[21] Appl. No.: 08/959,594

[22] Filed: Oct. 29, 1997

[51] Int. Cl.⁶ .................................................. G06F 13/00
[52] U.S. Cl. ...................................................... 395/200.33
[58] Field of Search ....................... 364/DIG. 1 MS File, 364/DIG. 2 MS File; 348/699, 700; 370/352; 379/88.04, 88.17; 382/22, 166, 223, 237, 245; 358/455; 395/200.33, 200.49; 707/501

[56] References Cited

U.S. PATENT DOCUMENTS 5,579,308  11/1996  Humpleman ............................ 370/352
5,838,910  11/1998  Domenikos et al. ............... 395/200.33

OTHER PUBLICATIONS

Broder; "Some applications of Rabin's fingerprinting method"; Methods in Communications, Security, and Computer Science; pp. 1–10; 1993.

Carter et al. "Universal Classes of Hash Functions" Journal of Computer and System Science; vol. 18 pp. 143–154; 1979.

*Primary Examiner*—Robert B. Harrell
*Attorney, Agent, or Firm*—Fenwick & West LLP

[57] ABSTRACT

In a distributed network, client computers are connected to server computers. The server computers store a plurality of Web pages. The Web pages are partitioned into sets, where each set includes Web pages that are substantially similar in content. A preset compression dictionary is generated for each set of Web pages. In addition, a fingerprint is generated for each preset dictionary. The fingerprints uniquely identify each of the preset dictionaries. When one of the client computers requests one of the Web pages, a compressed form of the Web page is sent along with the fingerprint of the dictionary that was used to compress the Web page. The client computer can then request the preset dictionary in order to decompress the Web page when the client does not have a copy of the preset dictionary.

10 Claims, 3 Drawing Sheets

COMPRESSION PROTOCOL WITH MULTIPLE PRESET DICTIONARIES

FIELD OF THE INVENTION

This invention relates generally to compressing digital signals, and more particularly to compressing data using preset dictionaries.

BACKGROUND OF THE INVENTION

While storing or communicating digital signals, i.e., data, it is well known that compressing the data saves space and time. Compressed data can be stored in less memory, and compressed data takes less time to travel along communication lines.

One set of commonly used compression techniques are based on the compressor and the de-compressor sharing data in what is commonly known as a dictionary. The dictionary can be fixed or adaptive as described below. The dictionary can be used to translate the data to a compressed form, and the inverse transformation can be applied to the compressed data to recover the original data. Compression advantages can be gained when the dictionary is sensitive to the content of the data. For example, different dictionaries would probably be used to compress data representing speech and video signals. Ideally, better compression can be achieved when the dictionary is highly dependent on the underlying data.

In one well known type of dictionary based compression, for example, Huffman encoding, a two stage process is used to produce a content sensitive dictionary. During the first pass, the compression process makes a partial or complete pass over the data to "learn" the relative frequency of compressible bit patterns. Bit patterns which occur frequently are then substituted with short codes, and less frequently occurring patterns are translated into longer codes, or perhaps not at all. During the second pass, original data are compressed according to the code substitutions defined by the fixed dictionary generated during the first pass. Decompression simply uses the dictionary to perform the inverse translation.

Another set of dictionary-based substitutional compression schemes is known as Lempel-Ziv (LZ) encoding, including LZ77, LZ78, LZW, etc. There, during a single pass, groups of bits (or characters) are encoded by referring to previous occurrence of the same group of bits of characters in the data record. In this case, an adaptive dictionary expresses a mapping between indices and previous occurrences of encoded patterns.

These types of compression techniques generally produce what is called "self-contained" output. That is, all the receiver needs is some generic implementation of a decompression process and the message itself, no external data are needed. The self-contained property requires that the compressed form of the message must include, in some way, the information about the dictionary.

For large messages, the overhead introduced by the dictionary is generally relatively small when compared with the time required to encode and decode, although the dictionary can grow quite large. Various schemes have been proposed for keeping the dictionary within some bounded size.

One place where data can benefit from compression is the World-Wide-Web (the "Web"). Over recent years, the amount of data stored and communicated via the Web has grown exponentially, particularly taking into consideration Web pages and Web e-mail. One drawback of known compression schemes is that most Web messages are relatively short, about 7K bytes per message.

Because adaptive self-contained schemes start with an empty dictionary, the compression efficiency for these small files is not as good as it would be for much larger files. For example, while a very large file might be compressed by a factor of ten, Web messages might only compress by a factor of two. Actual ratios may vary depending on content and technique used.

Therefore, it is desired to provide a dictionary based compression technique which works efficiently with small sized files.

SUMMARY OF THE INVENTION

Provided is a method for compressing Web pages communicated in a distributed computer system including client computers connected to server computers. The server computers store the Web pages. The Web pages are partitioned into sets where each set includes Web pages that are substantially similar in content.

A preset dictionary is generated for each set of Web pages. In addition, a fingerprint is generated for each preset dictionary. The fingerprints uniquely identify each of the preset dictionaries. When one of the client computers requests one of the Web pages, a compressed form of the Web page is responded along with the fingerprint of the dictionary that was used to compress the Web page. The client computer can use the fingerprint to determine if the preset dictionary is available in local storage, or to request the dictionary using the fingerprint identifier so the Web page can be decompressed.

DETAILED DESCRIPTION OF PREFERRED EMBODIMENTS

Figure 1:
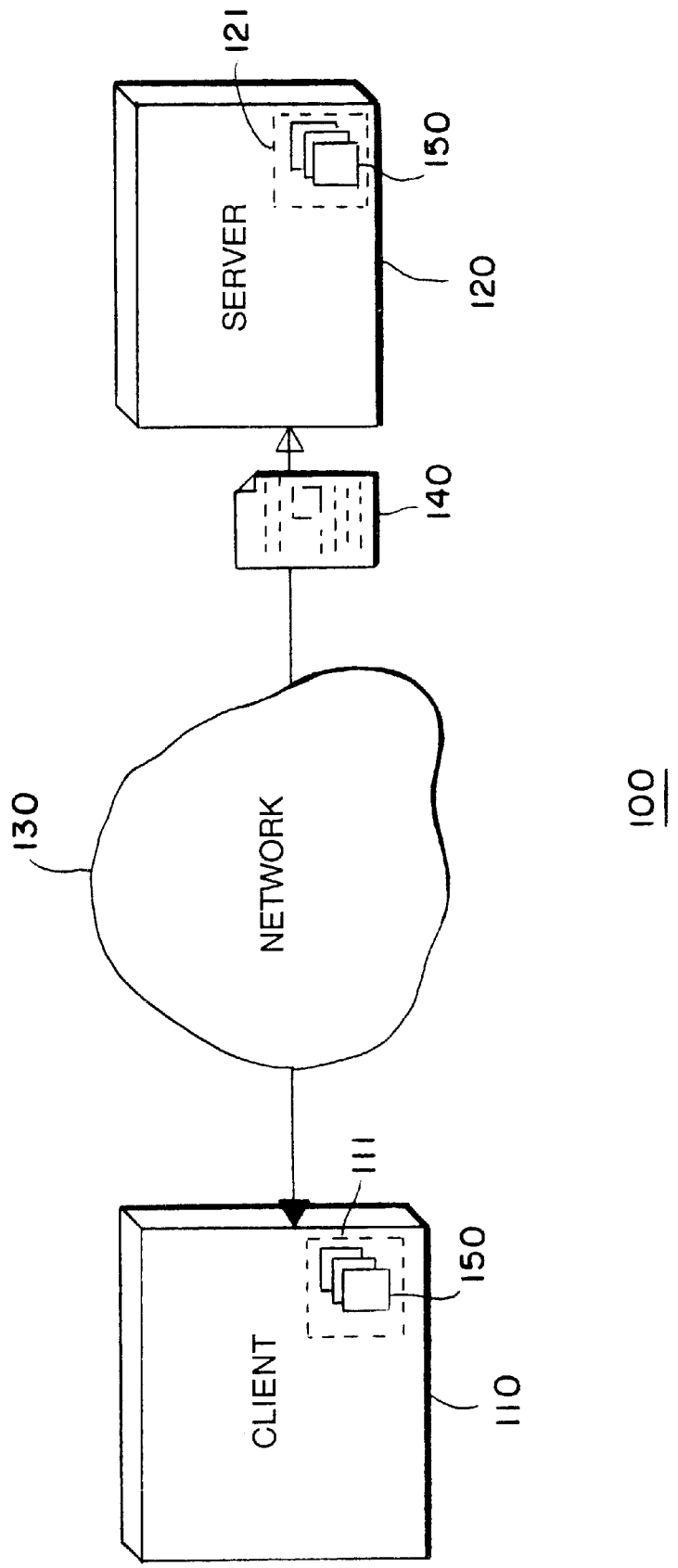
FIG. 1 is a block diagram of a network for using the compression technique according to the invention.

FIG. 1 shows an arrangement 100 including one or more client computers 110 connected to server computers 120 by a network 130. The clients 110 can be laptops, personal computers, or workstations. The servers 120 are typically larger computer systems. The clients and servers respectively include local memories 111 and 121 for storing data records, for example, one or more disks.

The network 130 provides communication paths for digital signals using, for example, the Internet Protocol (IP). At the application level, the clients 110 and servers 120 communicate data records 140 with each other using the HTTP protocol via, for example, a Web browser. The records can be composed as HTML "Web" pages or e-mail 140. The mean size of the records is relatively small, e.g., less than 10K bytes per message or page.

It is proposed that compression and de-compression of messages is accomplished by way of preset dictionaries 150 mutually agreed upon between a particular client and server. Usually, copies of the preset dictionaries 150 are present on both the client and the server computer systems so the dictionaries do not need to be transmitted as part of the messages. The preset dictionary can be a concatenation of other dictionaries.

The present technique is based on the fact that the content of dictionaries for related messages is often strongly correlated. For example, because a substantial number of Web pages and e-mail messages are written in standard English, they will share a set of common words, e.g., "a," "the," "in," "of," "he," and so forth. Furthermore, it is quite likely that these common words will appear frequently in the records 140. Therefore, representations of these common words, or pieces and combinations thereof, will be in the compression dictionaries for most of the messages. By building a dictionary from a file which contains the most frequently used words, and using this as an initial dictionary, one can avoid having to send these representations as part of the encoded message.

Figure 2:
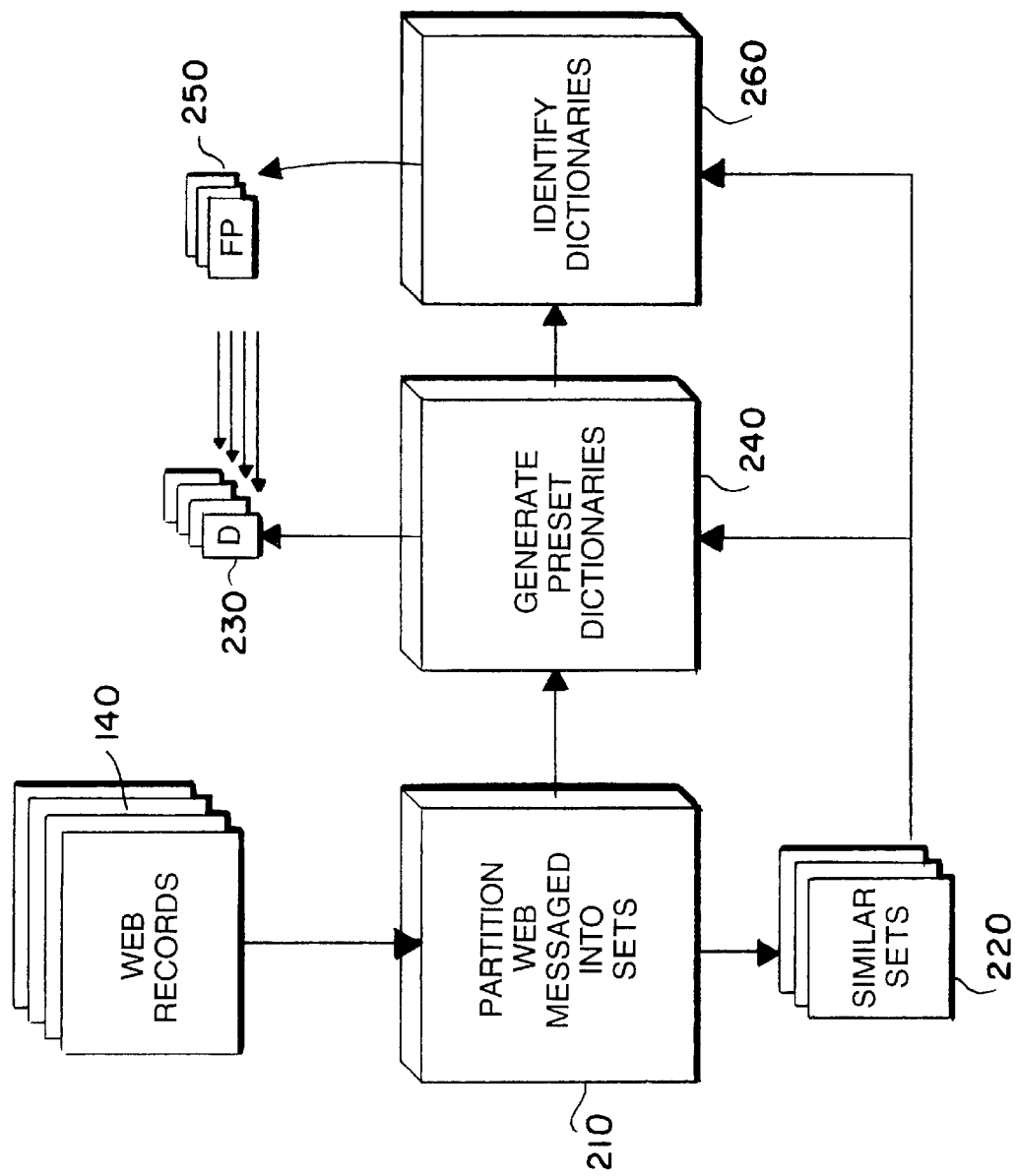
FIG. 2 is a block diagram of the encoding and decoding of Web messages.

In the context of the Web as shown in FIG. 2, the set of all Web data records 140, for example, HTML pages and e-mail, can be partitioned, step 210, into a smaller sets 220 of similar records. For each smaller set 220, a compression dictionary (D) 230 is generated in step 240 for the common information. In particular, there can be different dictionaries 230 for messages having different types of content, and additional different dictionaries for sub-classes of messages with similar content.

If a particular client 110 requests a particular record 140 of a particular set 220, and both the client and the server have a copy of this dictionary in advance, then the dictionary does not need to be transmitted with the compressed message. This dictionary can be used by the server and the client to respectively initialize the encoding and decoding processes. It still will generally be necessary to send additional dictionary information to represent compressed content for unique portions of the record that are not in the dictionary, but the total size of the compressed record will generally be significantly smaller given this initialized version of the dictionary.

In an alternative embodiment, the set of shared preset dictionaries can be dynamically extended. Suppose that a client requests a Web page P1 and is willing to use a preset dictionary. In practice, this can be indicated by the "Accept-Encoding" header of the HTTP protocol. The Web server could simply return the uncompressed page P1. The server could determine that the page P1 could also profitably share a dictionary D1 with other pages P2, . . . , PN which the server stores and which have similar content, i.e., pages P1, . . . , PN belong to the same set 220. In this case, the server could compress page P1 using the preset dictionary D1. The server then returns the compressed form of P1. The header of this message includes an indication of the compression scheme and dictionary used. Because only a relatively small number of compression methods are in practical use, the method can be indicated by name and version number, e.g., LZ77 or LZ78. At this point the client has the following choices. If the client has locally stored the dictionary, then decompression can proceed immediately.

However, the client may not have a copy of dictionary D1, perhaps because the server has never created it before, or because the client has never communicated with this particular server, or for other various reasons. In this case, the preset dictionary D1 needs to be sent to the client.

1) The client can reissue the request with an indication that a self-contained message should be responded.

2) The client may request the server to provide the dictionary. This request can be made using the standard HTTP protocol, or by some other means. This choice requires an additional round-trip network interaction. However, the dictionary will now be available for future interactions.

In any case where multiple preset dictionaries are possible, a key issue is how the client and server identify the required dictionary. In one approach, the dictionary's name is derived from the Uniform Resource Locator (URL) associated with the record. This is simple enough but has some drawbacks.

It may be useful to have many servers share the same preset dictionary. Then, after a particular client has loaded the dictionary into its local storage 111, the dictionary can also be used when receiving records from other servers. However, if multiple dictionaries are loaded over time, it may be difficult to arrange the dictionaries to have the same name on all servers, without some centralized management. In the Web environment, where the number of data records and the number of servers are extremely large and fluid, centralized management would practically be impossible.

In addition, it is necessary that the binding between a dictionary's name and content is stable, otherwise the client would use the same name for different (by content) dictionaries, and the resulting decompression would be incomprehensible.

It is proposed that a fingerprinting technique be used to identify preset dictionaries. With fingerprinting, a function is applied to a record (in this case the preset dictionary) to produce a relatively small bit string called a fingerprint which is strongly dependent on the content. In fact, with fingerprinting, records having different content will almost certainly have different fingerprints. Records with identical content will always have identical fingerprints. Please see, M. Rabin, "Fingerprinting by random polynomials," Harvard Center for Research in Computing Technologies, Report TR-15-81, 1981, and A. Broder, "Some applications of Rabin's fingerprinting method," Sequences II, Methods of Communications, Security, and Computer Science, pp. 143–152, Springer-Verlag, 1993.

Therefore, whenever the server 120 generates one of the dictionaries 230, a fingerprint 250 which uniquely identifies that dictionary is generated in step 260. The preferred embodiment of the invention uses a 128 bit fingerprint which is sufficient to avoid practically all collisions. Shorter fingerprints may also be possible. Because the HTTP protocol requires ASCII characters in header messages, the fingerprint may take 18 to 20 bytes, which is small compared to the reduction in size of the transmitted message. In the case that the preset dictionary is a concatenation, the identification can be a sequence of fingerprints of the other dictionaries.

Figure 3:
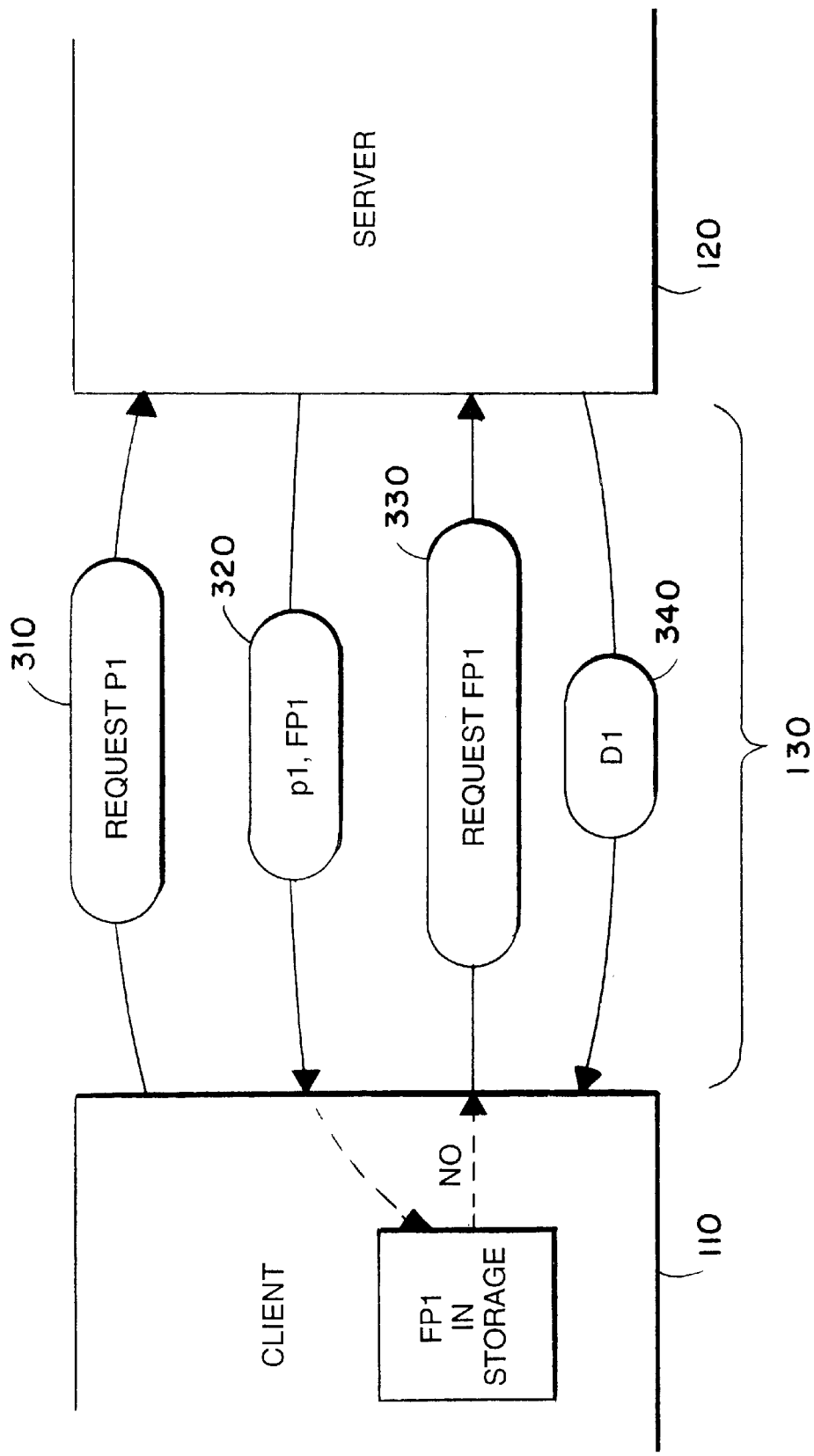
FIG. 3 is a flow diagram of requests and responses to obtain an identified preset dictionary.

FIG. 3 shows an interchange of messages between the client 110 and the server 120. The client makes a request 310 for a Web page P1 to the server 120 via the network 130. The server responds 320 with a compressed version p1 of the requested page P1, as well as the fingerprint (FP1) identifying the dictionary (D1) used to compress P1. The client 110 checks to see whether the associated dictionary (D1) is stored in local memory. If it is, then the dictionary is used to decode the page p1 and otherwise, the client requests the dictionary in message 330 using some URL-based HTTP protocol. The server replies with the dictionary D1 in message 340. At this point the fingerprint can be recomputed by the client to guard against corruption. The client uses the dictionary to decode the page p1, and can also store the dictionary in local memory for later use.

As an advantage, the client never has to compute the fingerprint. The fingerprint can be stored when the dictionary is received into the client's storage from the server. Thus, from the client's point of view, the fingerprint is opaque. Only servers would need to standardize on how fingerprints are computed. However, the client may want to verify that the fingerprint is correct, to prevent its dictionary storage space from being corrupted by malicious senders.

The client and server can also define a protocol for enabling "concatenated" dictionaries using multiple shared dictionaries. This would allow the total number of "super" dictionaries to increase without significantly increasing overhead.

It is estimated that the present technique has a gain of about 10% to 20% over compression techniques without preset dictionaries.

It is understood that the above described embodiments are simply illustrative of the principles of the invention. Various other modifications and changes may be made by those skilled in the art which will embody the principles of the invention and fall within the spirit and scope thereof.

We claim:

1. A computerized method for compressing a plurality of Web pages, comprising the steps of:

partitioning the plurality of Web pages into sets, each set including Web pages that are substantially similar in content;

generating a preset dictionary for each set of Web pages;

generating a fingerprint for each preset dictionary;

compressing the Web pages of each set using the associated preset dictionary.

2. The method of claim 1 wherein a client computer is connected to the server computer via a network, and further including the steps of requesting, by the client computer from the server computer, a particular Web page, responding the requested Web page in compressed form, and responding the fingerprint of a particular preset dictionary used to compress the particular Web page.

3. The method of claim 2 further including the step of requesting the particular dictionary from the server computer using the fingerprint of the particular dictionary when the client computer does not store a copy of the particular dictionary in a local memory of the client computer.

4. The method of claim 3 wherein the particular Web page is decoded using the particular dictionary.

5. The method of claim 4 further including the step of storing the particular dictionary in the local memory of the client computer.

6. The method of claim 3 wherein the fingerprint is recomputed after receiving the preset dictionary to detect errors.

7. The method of claim 2 further including the step of requesting the particular dictionary from a different server computer using the fingerprint of the particular dictionary when the client computer does not store a copy of the particular dictionary in a local memory of the client computer.

8. The method of claim 1 wherein the plurality of Web pages are partitioned by a Web server computer.

9. The method of claim 1 wherein the preset dictionary is concatenated from other dictionaries, and where the preset dictionary is identified by a sequence of fingerprints of the other dictionaries.

10. The method of claim 1 wherein the preset dictionary is concatenated from other dictionaries, and where the preset dictionary is identified by a fingerprint of possible concatenations of the other dictionaries.

* * * * *